(12) United States Patent
Ando et al.

(10) Patent No.: US 6,185,217 B1
(45) Date of Patent: Feb. 6, 2001

(54) TIMER SYNCHRONIZING DEVICE AND INITIALIZING METHOD FOR USE IN RING COMMUNICATION PATH

(75) Inventors: Toru Ando; Koji Eba, both of Niwa-gun (JP)

(73) Assignee: Okuma Corporation, Nagoya (JP)

(*) Notice: Under 35 U.S.C. 154(b), the term of this patent shall be extended for 0 days.

(21) Appl. No.: 09/025,076

(22) Filed: Feb. 17, 1998

(51) Int. Cl.[7] .............................. H04L 12/28; H04L 7/00; H04J 3/06
(52) U.S. Cl. ......................... 370/403; 370/503; 375/356
(58) Field of Search .................... 370/503, 509, 370/510, 512, 258, 222, 252, 403, 452, 460; 342/384, 397; 375/355, 356, 357; 455/502; 709/208, 251

(56) References Cited

U.S. PATENT DOCUMENTS

| | | | |
|---|---|---|---|
| 4,539,678 | * 9/1985 | Ambroise et al. | 370/438 |
| 4,615,029 | * 9/1986 | Hu et al. | 370/449 |
| 4,845,709 | * 7/1989 | Matsumoto et al. | 370/452 |
| 4,982,185 | * 1/1991 | Holmberg et al. | 340/825.21 |
| 5,333,299 | * 7/1994 | Koval et al. | 713/400 |
| 5,361,260 | * 11/1994 | Mito | 370/452 |
| 5,377,228 | * 12/1994 | Ohara et al. | 375/211 |
| 5,907,685 | * 5/1999 | Douceur | 709/248 |
| 6,005,869 | * 12/1999 | Sakai et al. | 370/452 |

\* cited by examiner

*Primary Examiner*—Hassan Kizou
*Assistant Examiner*—Saba Tsegaye
(74) *Attorney, Agent, or Firm*—Oliff & Berridge, PLC

(57) ABSTRACT

A device and an initializing method for use in a ring communication path, which can highly accurately synchronize time of the master and slave stations so as to achieve accurate communication among those stations. According to this device and method in which timers of respective slave stations connected to a ring communication path are synchronized using a specific communication frame, a master station recognizes the number of slave stations and their connection sequences, and notifies each of the slave stations of an individual communication delay time. Respective slave stations correct their timers so as to agree to that of the master station.

3 Claims, 6 Drawing Sheets

TIMER SYNCHRONIZING DEVICE AND INITIALIZING METHOD FOR USE IN RING COMMUNICATION PATH

BACKGROUND OF THE INVENTION

1. Field of the Invention

The present invention relates to a timer synchronizing device and an initializing method for use in a communication system. In particular, the timer synchronizing device of the present invention can synchronize accurately timers of slave stations connected to a ring communication path.

2. Description of the Prior Art

Conventionally, respective timers connected to a ring communication path are synchronized using a specific communication frame. In the following, one such example will be described. In this example, timers on a ring communication path are synchronized according to SERCOS regulations.

FIG. 6 shows the structure of a conventional ring communication path which includes a master station 64 and slave stations 61, 62, 63. The master station 64 outputs a specific communication frame called SYNC-TELEGRAM for timer synchronization. The frame is first received by the slave station 61, which then corrects its own timer 66 according to the received frame. The slave station 61 also relays the received frame to its subsequent station, so that the slave station 62 receives the relayed frame and corrects its own timer 67 accordingly.

In this manner, respective slave stations connected to the ring communication path 65 sequentially receive the specific frame and correct their timers. This entire process for timer synchronization is completed when a timer correcting operation by the last connected slave station 63 is completed. It should be noted that the timing at which respective slave stations receive the specific frame is gradually delayed as the frame reaches the latter connected stations on the path as a result of a frame relaying process at each station. Because the delay is minimized by setting a 0.5 to 1.5 clock transmission delay at each slave station, disagreement among respective timers can be left uncorrected.

Another example will next be described with reference to FIG. 5. In this example, timer synchronization is achieved with improved transfer efficiency by using a method including a communication frame exchanging process. "Exchanging a communication frame" refers to exchanging a part or the whole of a communication frame transferred through a ring communication path 5, with transmission data 55 at its destination slave station.

In the following, a procedure in which slave stations receive a communication frame will be described.

A destination detection circuit 53 receives a communication frame, beginning with its leading bits. The circuit 53 then compares the destination address of the frame with the address of its own station, which is recorded in its own address storage 54 when the circuit 53 reads the destination address, so as to detect whether or not the received frame addresses its own station as a destination station. If the frame does address that station, the communication frame is supplied to a communication frame exchanging circuit 52. If it does not, the frame is supplied to a relay circuit 51. Every communication frame, including a frame for timer synchronization, is subjected to this destination detection process at each slave station, regardless of its destination. That is, frame transmission is always delayed due to this process (hereinafter this delay time being referred to as a relay process time). A relay process time caused at each station will accumulate as a frame passes through the respective slave stations performing relay processing on the path.

The accumulated relay process time results in a problem in a system, such as a machine tool, whose motors are controlled using this method. That is, reference times at respective motors may disagree with one another due to a relay process time, which is on the order of a few $\mu$s for each station, and this may further result in such a system forming an inaccurate trail. For instance, assuming that a relay process time is 6 $\mu$s and a feeding time of each motor is 20 m/min, the entire influence of the delay over the system sums up to be 2 $\mu$m.

As described above, the conventional timer synchronizing method cannot achieve accurate timer synchronization because of the presence of a transmission time delay, and thus cannot achieve accurate time synchronization among respective slave stations on a ring communication path. Therefore, if a master station and slave stations are connected such that a communication frame is transmitted among the stations at a subtle timing based on the timers which have been synchronized using the conventional method, transmission contents come to be faulty between the master and the slave stations. Moreover, the greater the number of slave stations connected to a path, the greater will be the time delay in latter connected slave stations along the path. Conclusively, the conventional timer synchronizing method in which a transmission time delay is left uncorrected is inappropriate to be used in a ring communication path which requires severe time accuracy.

SUMMARY OF THE INVENTION

The present invention has been conceived to overcome the above problems and aims to provide a timer synchronizing device and an initializing method for a communication system. A timer synchronizing device and an initializing method of this invention are used particularly in a system which employs a method including a communication frame exchanging process and thus causes a larger frame transmission delay than by other systems, such as a SERCOS system, which do not use such a process.

With this timer synchronizing device, respective timers of master and slave stations connected to a ring communication path can be synchronized without being affected by a communication time delay.

According to the present invention, there can be provided a timer synchronizing device for synchronizing timers of respective slave stations connected to a ring communication path by using a specific communication frame, comprising recognizer installed in a master station for recognizing the number of slave stations connected to the ring communication path, and their respective connection sequences; notifier installed in the master station for notifying the slave stations of transmission delay times according to the respective connection sequences; and correcter installed in the slave stations for correcting a time difference for synchronization between the timer of the master station and the timers of the slave stations.

Also, according to the present invention, there can be provided an initializing method for initializing communication addresses of slave stations connected to a ring communication path for synchronization of timers of the slave stations by using a specific communication frame, comprising a step in which a master station recognizes the number of the slave stations connected to the ring communication path and connection sequences thereof; a step in which the master station notifies the slave stations of transmission delay times according to the connection sequences; and a step in which the slave stations correct a time difference caused in synchronization between the timer of the master station and the timers of the slave stations.

Further, the above method further comprises a step in which the master station calculates the transmission delay times to notify the slave stations, based on an accumulated value of respective transmission delay times, of which the slave stations individually inform the master station at initialization.

According to the timer synchronizing device and an initializing method of the present invention, the timers of the master and slave stations connected to a ring communication path can be accurately synchronized when the slave stations receive a specific communication frame for timer synchronization. This is achievable even when the frame transmission between the master and slave stations includes a communication frame exchanging process, because a transmission delay time is defined individually for every slave station so that each slave station can correct its own timer by an extent based on the transmission delay time.

BRIEF DESCRIPTION OF THE DRAWINGS

The above and other objects, features, and advantages, will become further apparent from the following description of the preferred embodiment taken in conjunction with the accompanying drawings wherein.

DESCRIPTION OF THE PREFERRED EMBODIMENTS

Figure 1:
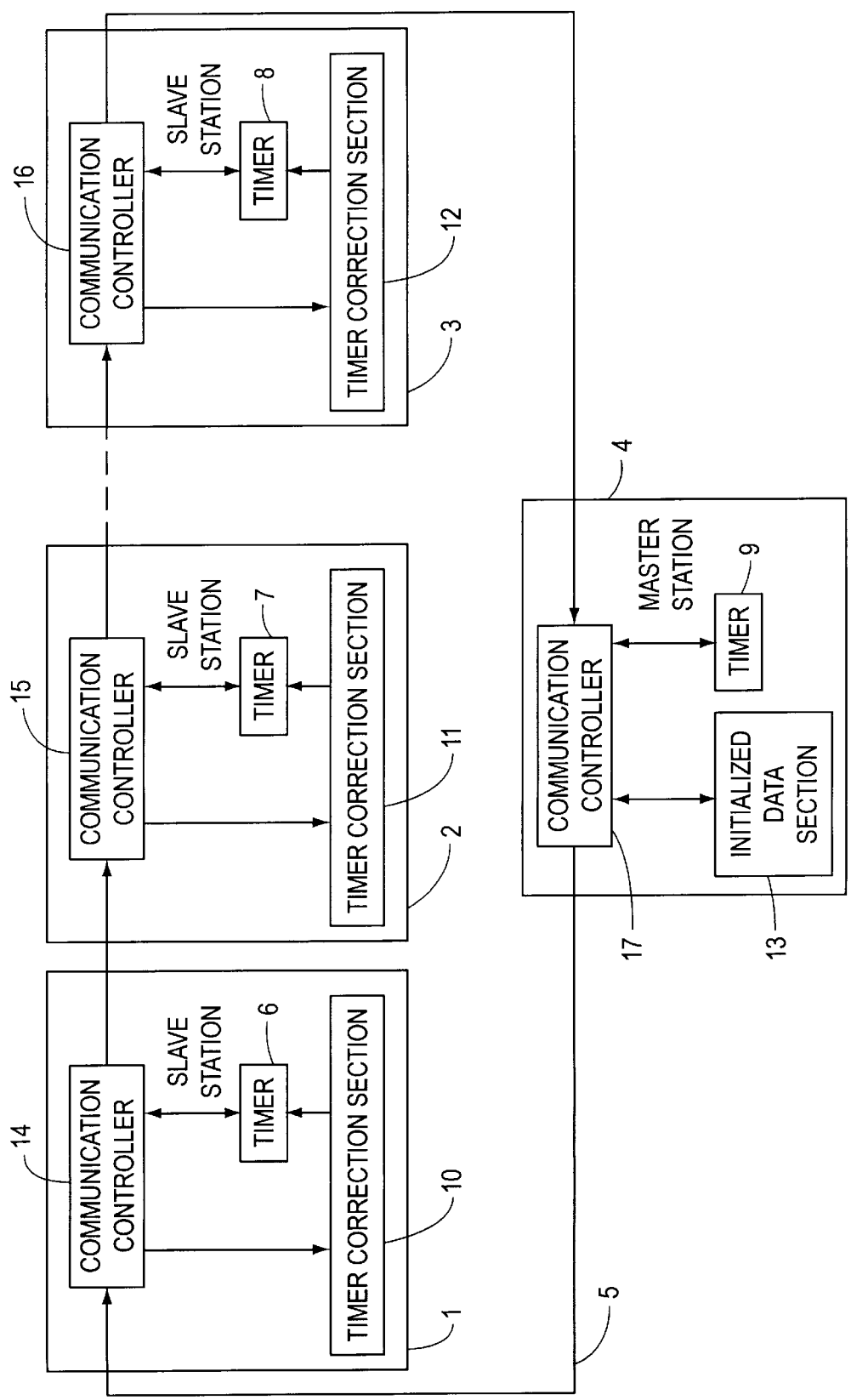
FIG. 1 is a diagram showing a preferred embodiment of a timer synchronizing device and an initializing method of the present invention.
Figure 2:
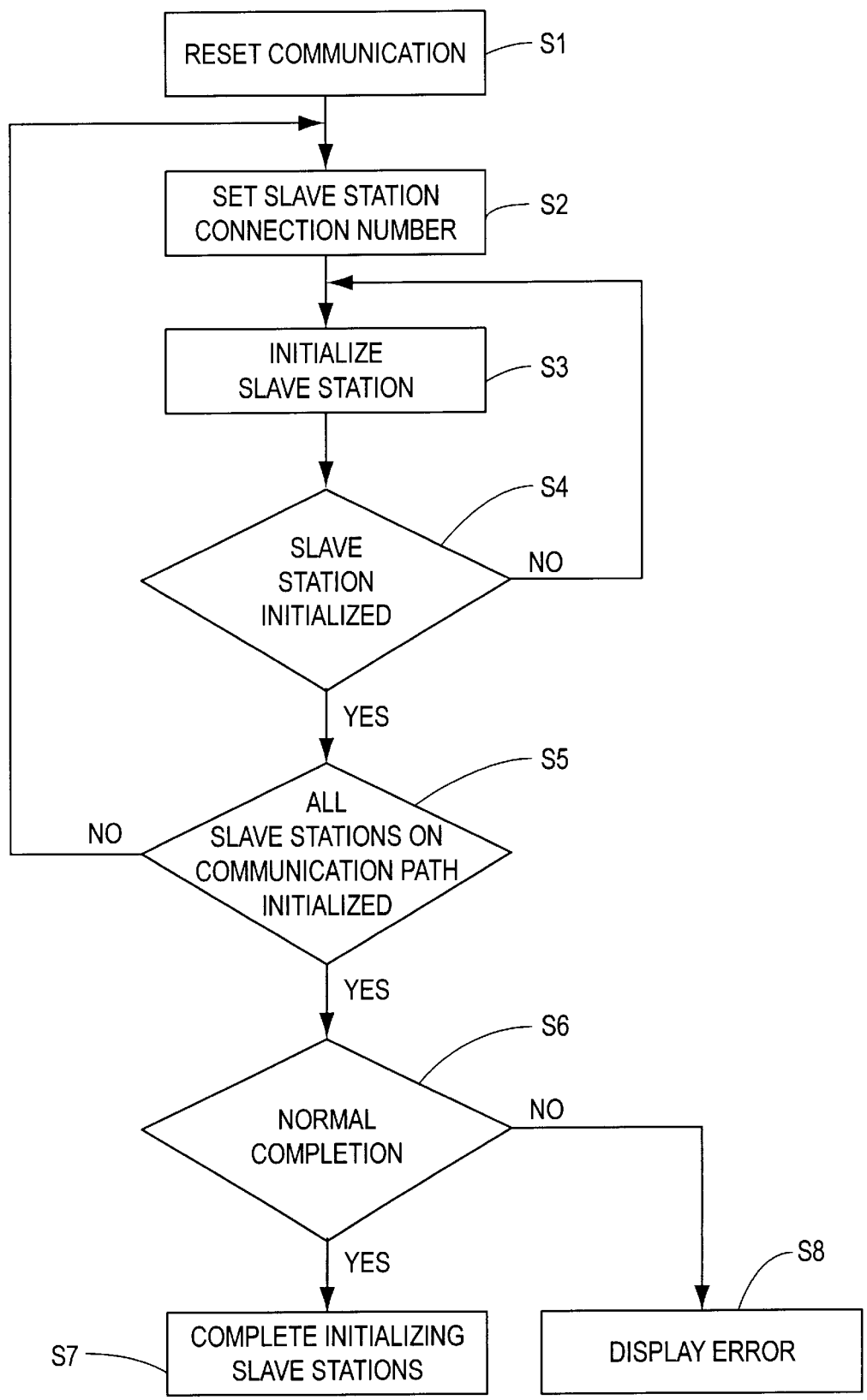
FIG. 2 is a flowchart for an initializing method of the present invention.
Figure 3:
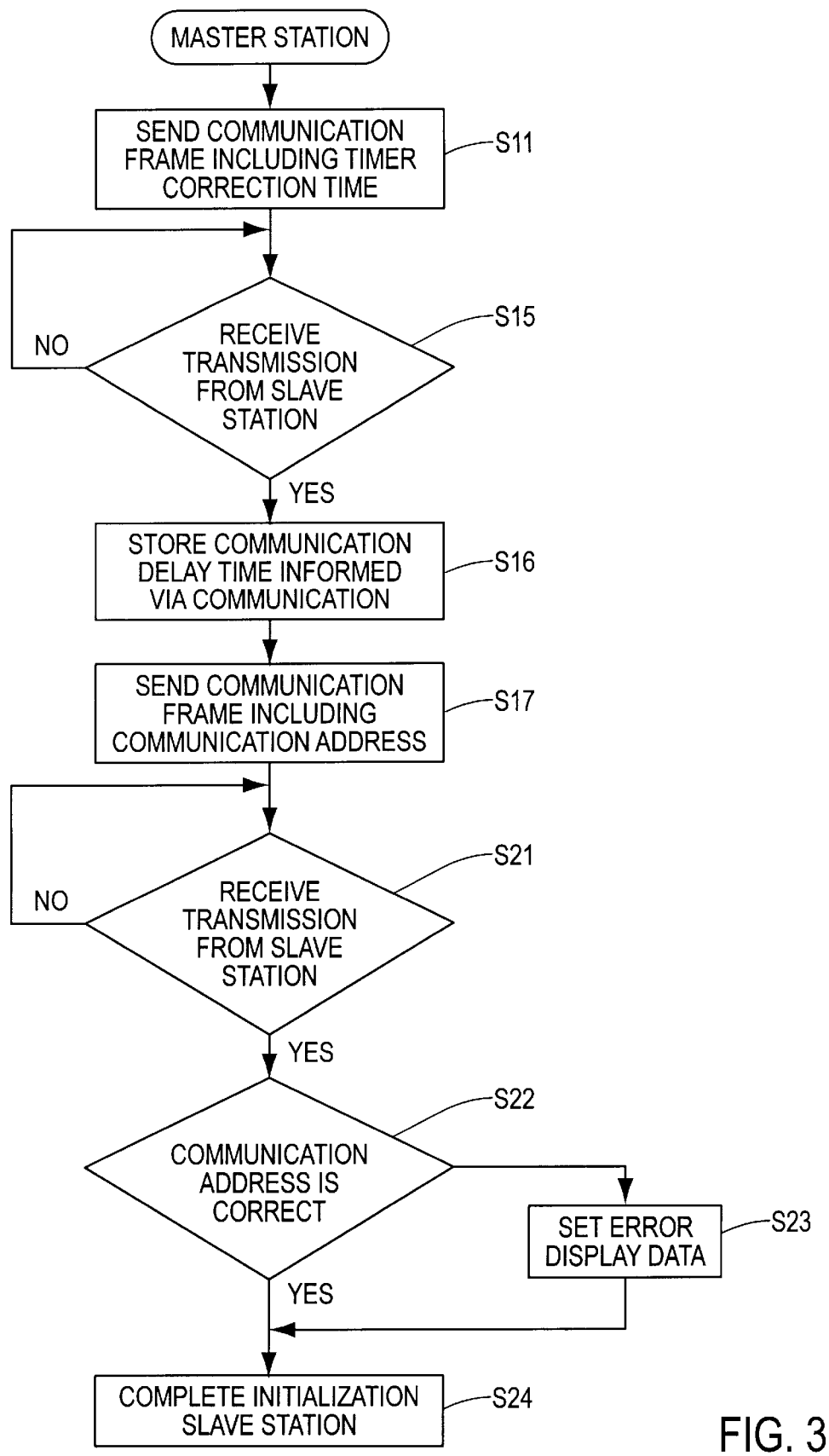
FIG. 3 is a flowchart of an operation by a master station according to the initializing method of the present invention.
Figure 4:
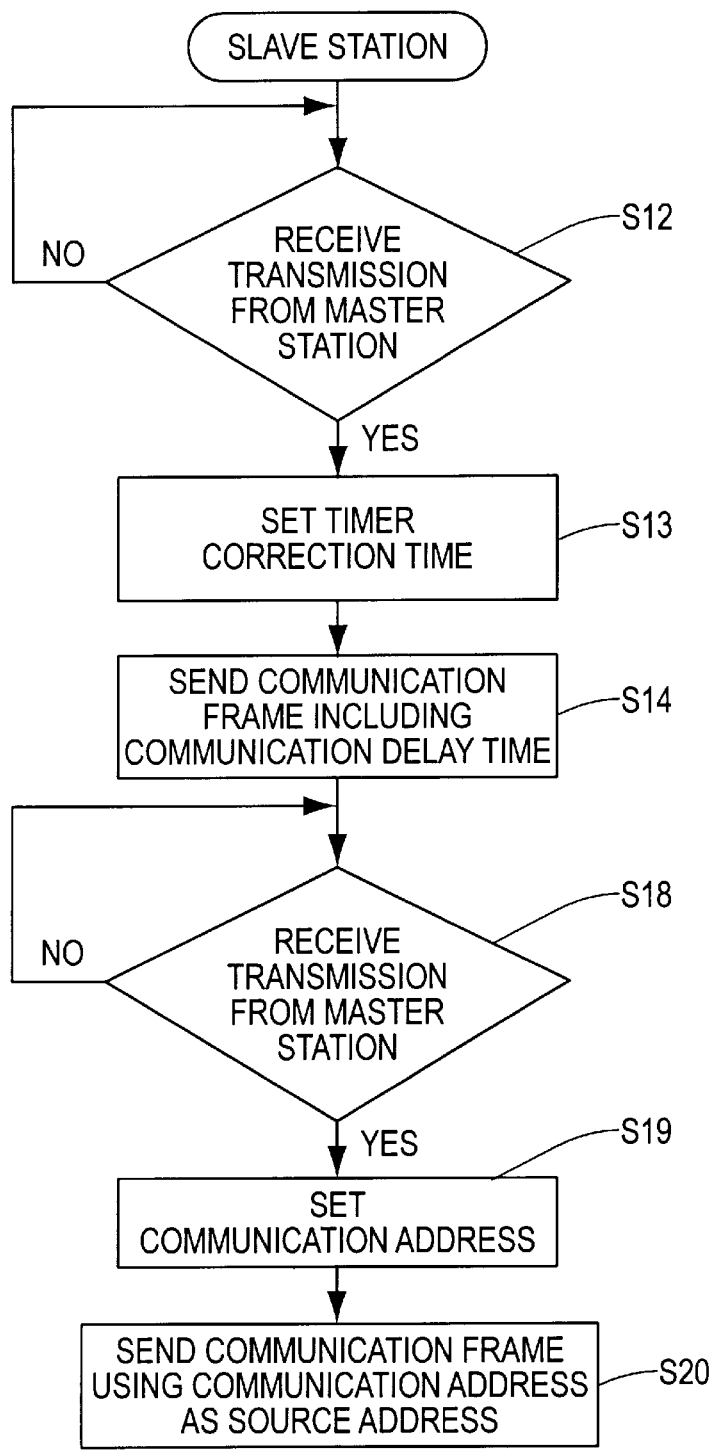
FIG. 4 is a flowchart of an operation by a slave station according to the initializing method of the present invention.
Figure 5:
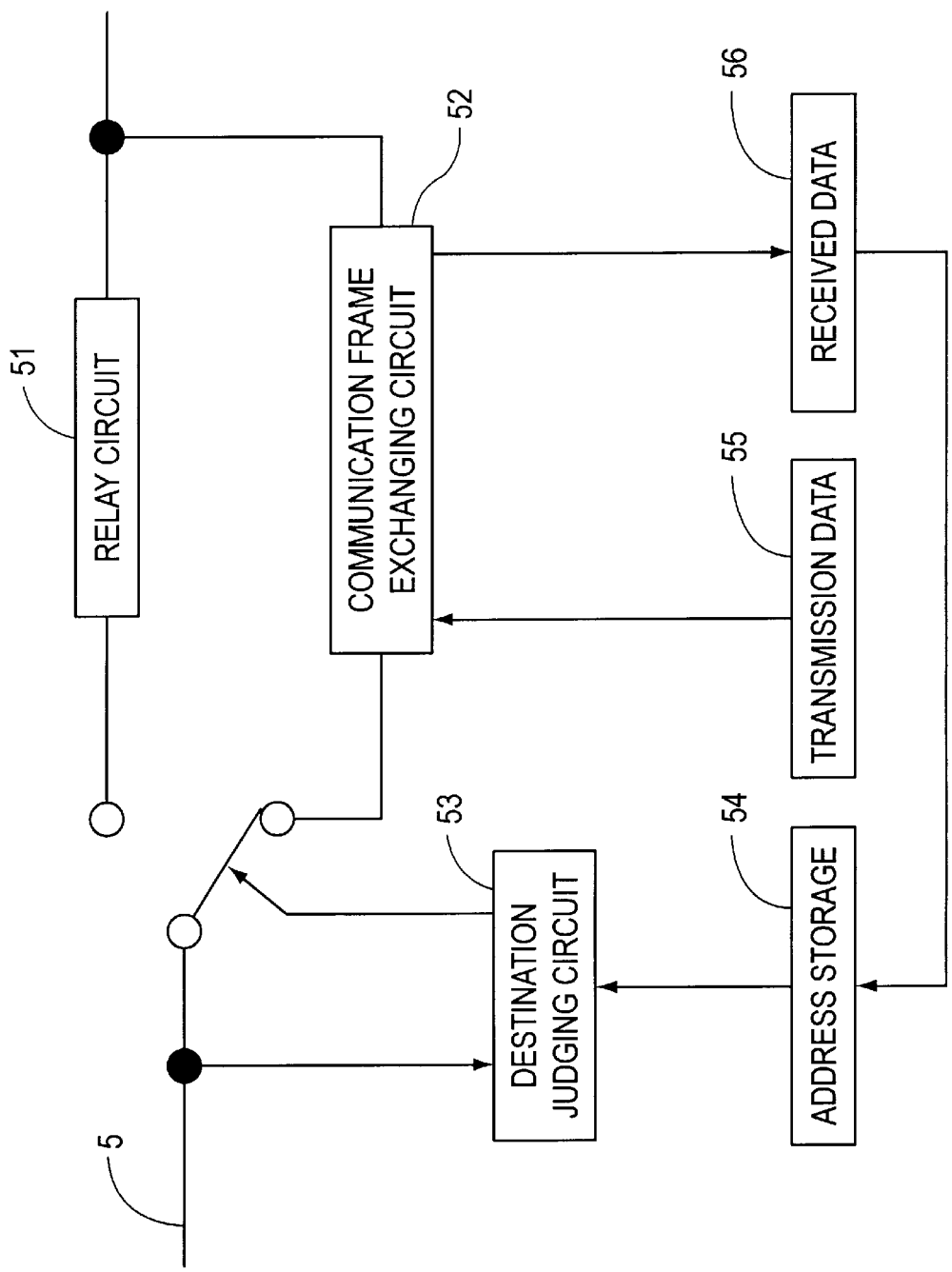
FIG. 5 is a diagram showing the structure of a communication controller of a slave station.
Figure 6:
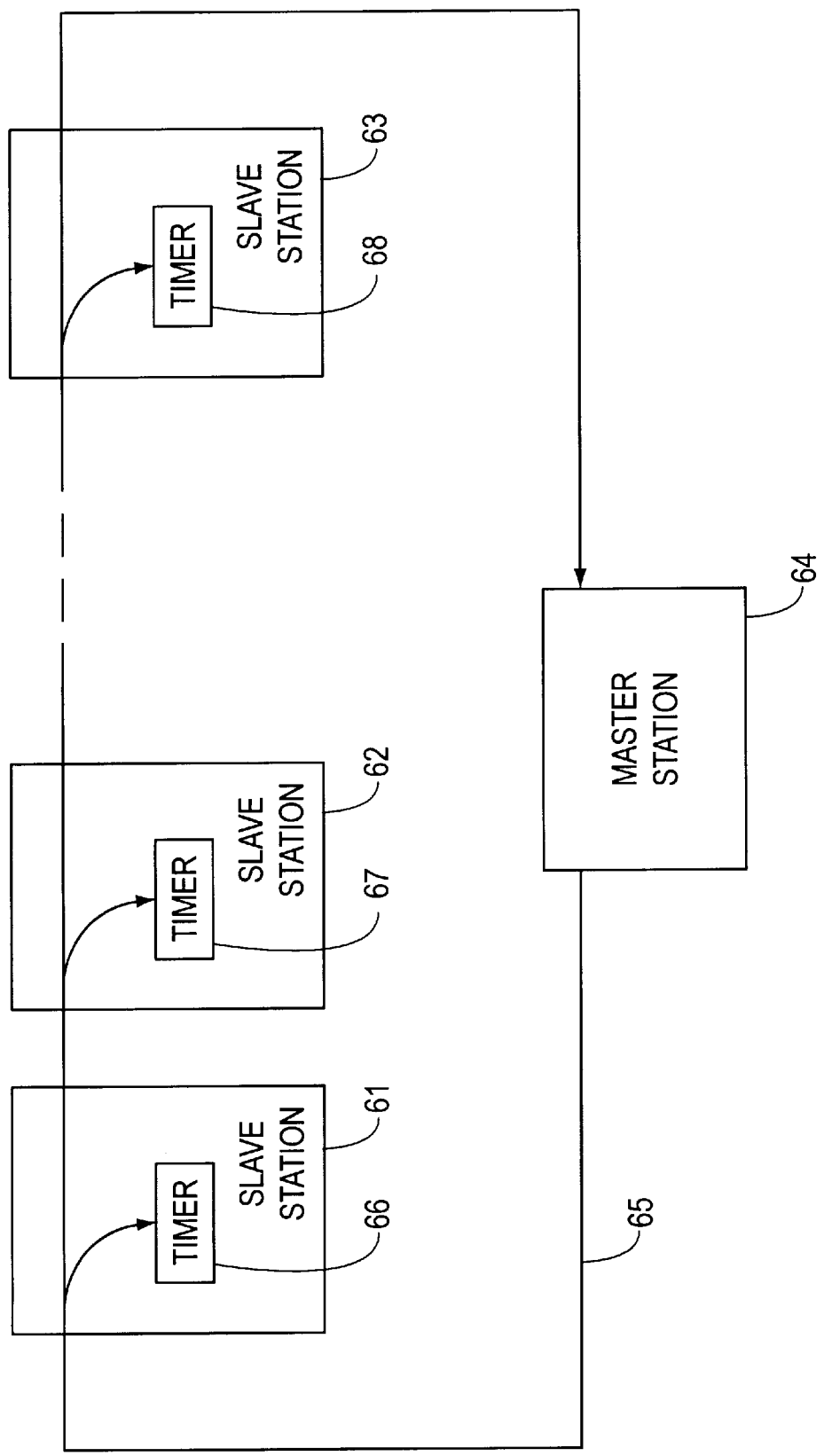
FIG. 6 is a diagram showing an example of a ring communication path using a conventional method.

FIG. 1 shows a preferred embodiment of a timer synchronizing device and an initializing method according to the present invention. FIG. 2 is a flowchart for an initializing method of the present invention. FIGS. 3 and 4 are flowcharts of the operations of master and slave stations, respectively.

Referring to FIGS. 1, 2, the master station 4 outputs a communication reset command to reset communication controllers 14, 15, 16 of the respective slave stations 1, 2, 3 (step 1). Note that this command is not for timer synchronization among the master station 4 and the slave stations 14, 15, 16. With the command received, the slave stations 1, 2, 3 connected to the ring communication path 5 are given the same initial communication address, which is recorded in their respective address storage.

Subsequently, the master station 4 sets a slave station connection number (step 2), and begins initializing the slave station (step 3).

Correspondence regarding initialization between the master and slave stations will next be described in detail, referring to FIGS. 3, 4.

After setting an initial destination address, the master station 4 outputs a communication frame including data on a timer correction time (step 11). The first connected slave station on the ring communication path 5, namely, the slave station 1, receives the communication frame (step 12), and sets the timer correction time on its own timer correction section 10 so that its own timer 6 is corrected when it receives a specific communication frame for timer synchronization (step 13). The slave station 1 then outputs a communication frame to the master station 4, which includes data on a transmission delay time consisting of the timer correction time and a delay time caused at the slave station 1 due to a relaying process for the communication frame to its subsequent station (step 14).

Having received this frame with data on a transmission delay time (step 15), the master station 4 stores the data on a transmission delay time in its initialized data section 13 (step 16). The master station 4 then outputs a communication frame which includes a communication address for the slave station 1, which is different from the initial communication address value (step 17). The slave station 1 having received the communication frame (step 18) sets the communication address in the address storage 54, referring to the content of the received frame (step 19), and sends a communication frame to the master station 4, using the newly set communication address as a source station address (step 20).

At the time when the master station 4 receives the communication frame (step 21) and checks its communication station address (step 22), a series of initializing processes with respect to the slave station 1 are completed (step 24). The slave station 1 will use the newly set communication address in subsequent transmission.

It should be noted that the master station 4 knows the connection sequences, which correspond to a slave station connection number, and the communication address of the slave station 1, by referring to data stored in the initialized data section 13. If an erroneous communication address is detected, the master station 4 sets error display data (step 23).

After the slave station 1 was initialized, the master station 4 starts initializing the slave station 2, using the same method as above. In this initialization, the master station 4 uses the transmission delay time informed by the slave station 1 and recorded in the initialized data section 13, as a timer correction time for the slave station 2. A communication frame outputted from the master station 4 is not inputted into, but only relayed by the slave station 1, which has by then been initialized and acquired a communication address, and is received by the slave station 2 instead. After the slave station 2 is initialized accordingly, it informs the master station 4 of a new transmission delay time which is an addition of the transmission delay time informed by the slave station 1 to the master station 4 and a delay time occurred at the slave station 2 in connection with relaying the communication frame.

As shown in FIG. 1, the master station 4 initializes the remaining slave stations in the same manner as above sequentially following the connection sequences until the last connected station is initialized. The master station 4 knows completion of the whole initialization processes (step 5) when the master station 4 itself receives a communication frame including data on a timer correction time which has been returned to the master station 4 without being received by any slave station.

After all the slave stations on the communication ring path have been initialized (step 7), the master station 4 can determine the number of slave stations connected to the path, as well as their connection sequences and communication addresses by referring to the data in the initialized data section 13.

It should be noted that an error, if occurring during the initializing process, will be displayed after completion of the whole initializing process (step 8), rather than discontinuing the process for display of every error occurrence.

Then, when all the slave stations on the path receive a specific frame for timer synchronization, disagreement among respective timers 6, 7, 8 is corrected using respective timer correction times which have been set in the timer correction sections 10, 11, 12 at initialization, whereby those timers 6, 7, 8 are synchronized.

As described above, according to the timer synchronizing device and an initializing method of the present invention, the timers of master and slave stations connected to a ring communication path can be synchronized in spite of a transmission time delay, and the timers can be accurately synchronized even by using a transmission method including a communication frame exchanging process.

While there have been described what are at present considered to be preferred embodiments of the invention, it will be understood that various modifications may be made thereto, and it is intended that the appended claims cover all such modifications as fall within the true spirit and scope of the invention.

What is claimed is:

1. A timer synchronizing device for synchronizing timers of respective slave stations connected to a ring communication path by using a specific communication frame, comprising;

a notifier installed in a master station for notifying each slave station of a transmission delay time according to a transmission delay time provided to the master station by a previous slave station;

a corrector installed in each slave station for correcting a time difference for synchronization between a timer of the master station and a timer of the slave station; and a recognizer installed in a master station for recognizing the number of slave stations connected to the ring communication path, and their respective connection sequences.

2. An initializing method for initializing communication addresses of slave stations connected to a ring communication path for synchronization of timers of the slave stations by using a specific communication frame, comprising:

a step in which the master station notifies each slave station of a transmission delay time according to a transmission delay time provided to the master station by a previous slave station; and a step in which each slave station corrects a time difference caused in synchronization between a timer of the master station and a timer of the slave station; and a step in which a master station recognizes the number of the slave stations connected to the ring communication path and connection sequences thereof.

3. The method as defined in claim 2, further comprising:

a step in which the master station calculates the transmission delay times to notify the slave stations, based on an accumulated value of respective transmission delay times, of which the slave stations individually inform the master station at initialization.

* * * * *